United States Patent
Binns

(10) Patent No.: US 10,356,393 B1
(45) Date of Patent: Jul. 16, 2019

(54) HIGH RESOLUTION 3D CONTENT

(71) Applicant: Amazon Technologies, Inc., Reno, NV (US)

(72) Inventor: Justin Michael Binns, Auburn, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 780 days.

(21) Appl. No.: 14/623,417

(22) Filed: Feb. 16, 2015

(51) Int. Cl.
- *H04N 13/239* (2018.01)
- *H04N 5/232* (2006.01)
- *H04N 13/275* (2018.01)

(52) U.S. Cl.
CPC ....... *H04N 13/239* (2018.05); *H04N 5/23216* (2013.01); *H04N 13/275* (2018.05)

(58) Field of Classification Search
CPC ........... H04N 13/0239; H04N 5/23216; H04N 13/0275; H04N 13/239; H04N 13/275
See application file for complete search history.

(56) References Cited

U.S. PATENT DOCUMENTS

| | | | |
|---|---|---|---|
| 5,495,576 A * | 2/1996 | Ritchey | G06T 17/00 345/420 |
| 9,406,131 B2 * | 8/2016 | Wurmlin | G06T 5/005 |
| 2008/0062123 A1 * | 3/2008 | Bell | G06F 3/011 345/156 |
| 2009/0141905 A1 * | 6/2009 | Warhol | G06F 3/011 381/61 |
| 2010/0111489 A1 * | 5/2010 | Presler | H04N 5/225 386/278 |
| 2015/0055937 A1 * | 2/2015 | Van Hoff | H04N 13/243 13/243 |
| 2015/0112686 A1 * | 4/2015 | Kiyoshige | G10H 1/0083 704/258 |

OTHER PUBLICATIONS

Matsuyama et al. ("Real-time dynamic 3-D object shape reconstruction and high-fidelity texture mapping for 3-D video," in IEEE Transactions on Circuits and Systems for Video Technology, vol. 14, No. 3, pp. 357-369, Mar. 2004.).*

* cited by examiner

Primary Examiner — Maria E Vazquez Colon
(74) Attorney, Agent, or Firm — Hogan Lovells US, LLP

(57) ABSTRACT

Image and audio data can be captured over a period of time. The image data can be captured by a plurality of cameras positioned to capture images that sufficiently represent an environment (e.g., a movie set, scene, or office setting). The audio data can be captured over the period of time by a plurality of microphones spatially arranged throughout the environment. The images can be stitched or otherwise combined to generate a three-dimensional representation of the environment and objects in the environment (e.g., people or furniture), where the three-dimensional representation reflects changes (e.g., object movement or changes in lighting) that occurred in the environment over the period. For each period of time, audio data can be mapped to a corresponding region of the environment. Information representing a virtual environment of the three-dimensional representation of the environment can be encoded for device playback and stored.

18 Claims, 13 Drawing Sheets

HIGH RESOLUTION 3D CONTENT

BACKGROUND

Users are increasingly utilizing electronic devices to obtain various types of information. For example, users are accustomed to viewing high resolution images, videos, or animations of content. As an example, an increasing number of applications are attempting to meet these expectations by providing a virtual reality, enhanced reality, or three-dimensional experience. A large number of devices still utilize conventional two-dimensional displays or provide content that is substantially created in two dimensions. While certain shading or rendering can be utilized to give the impression of three-dimensional content, the content will typically not act like a true three-dimensional object or scene, as changes in position, orientation, or lighting will generally not be updated realistically in the display. Thus, the virtual nature of the displayed content can be significantly degraded. Further, often times, the view of content conventional devices provides cannot replace the experience of viewing the content in real life. While some content providers have attempted to provide virtual reality type environments, approaches in providing these environment are expensive and generally cost prohibitive.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the foregoing or other deficiencies experienced in conventional approaches for generating and displaying content using an electronic device. In particular, in various embodiments, a system or service in communication with the system, can receive image and audio data captured over a period of time. The image data can be captured by a plurality of cameras positioned to capture images that sufficiently represent an environment (e.g., a movie set, scene, office setting, etc.) The system can receive audio data captured over the period of time by a plurality of microphones spatially arranged throughout the environment. The images can be stitched or otherwise combined to generate a three-dimensional representation of the environment and objects in the environment (e.g., people, furniture, etc.), where the three-dimensional representation reflects changes (e.g., object movement, changes in lighting, etc.) that occurred in the environment over the period of time. For each period of time of the period of time, audio data can be mapped to a corresponding region of the environment. Information representing a virtual environment of the environment can be encoded for device playback and stored.

Thereafter, the information representative of the virtual environment can be accessed by a user, or a device of a user, where the user can navigate the virtual representation of the environment from a particular view at a particular time. For example, the user can be provided a view of the virtual environment that is based at least in part upon a current relative position and/or orientation of the viewer with respect to the device, as well as changes in that relative position and/or orientation. The content can include various portions, and different adjustments can be applied to each portion based upon these and/or other such changes. For example, the user can navigate the virtual representation of the environment from a particular view at a particular time as if the user were looking through a window, enabling the user to see an augmented reality of the user's surroundings on the display screen of the device. For example, the user can be provide a view of the virtual environment that is based at least in part upon a current relative position and/or orientation of the viewer with respect to the device, as well as changes in that relative position and/or orientation. In this way, the device displays images in a way as if the user were looking through a window, enabling the user to see an augmented reality of the user's surroundings on the display screen of the device.

Various other functions and advantages are described and suggested below as may be provided in accordance with the various embodiments.

Figure 1A:
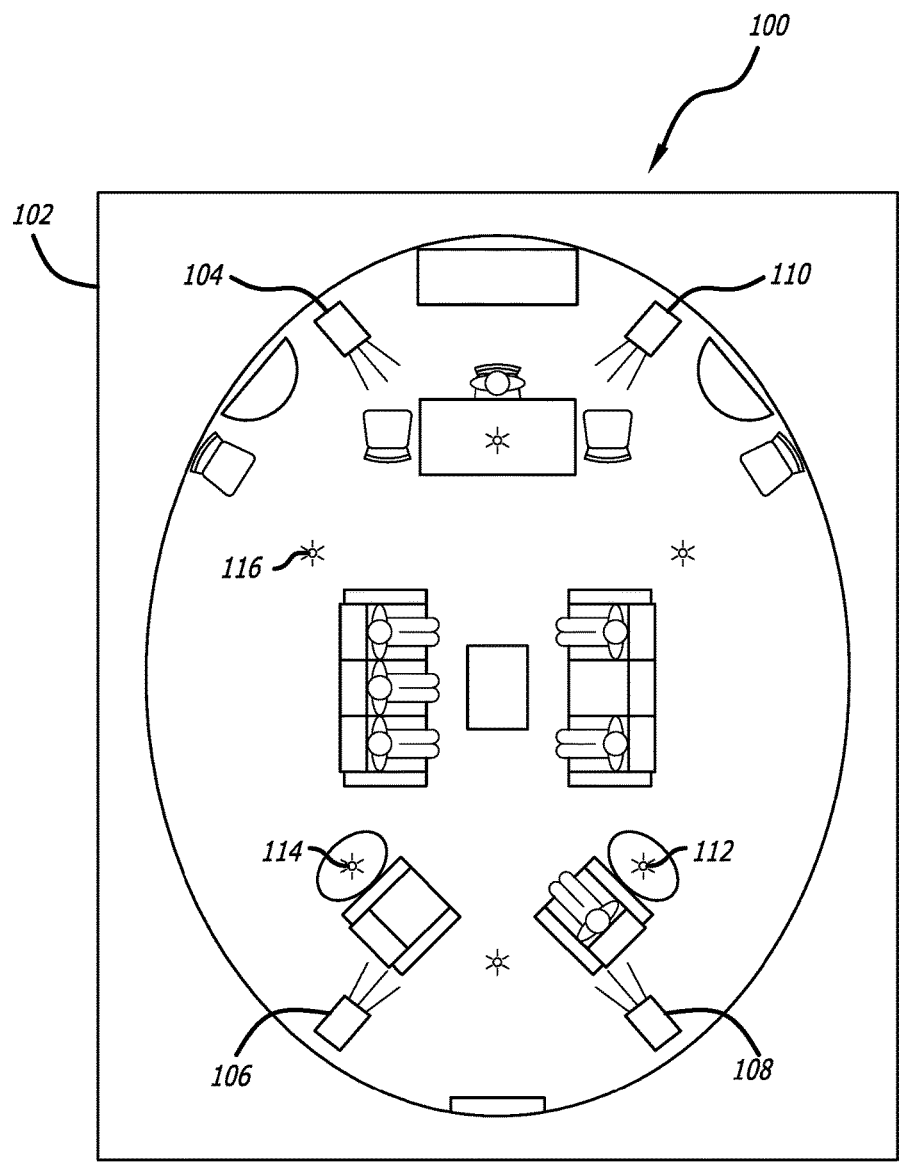
FIGS. 1A-1C illustrate example situation of obtaining information on persons, objects, and/or areas to be used in accordance with various embodiments.
Figure 1B:
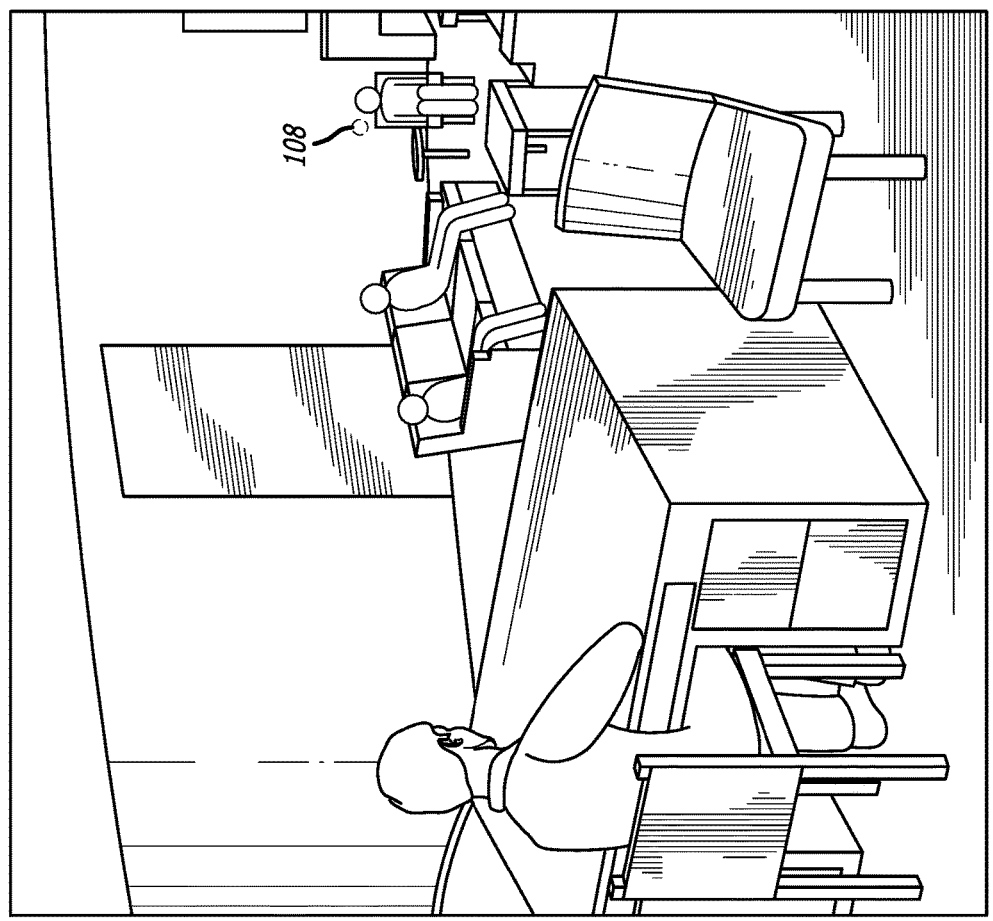
Figure 1C:
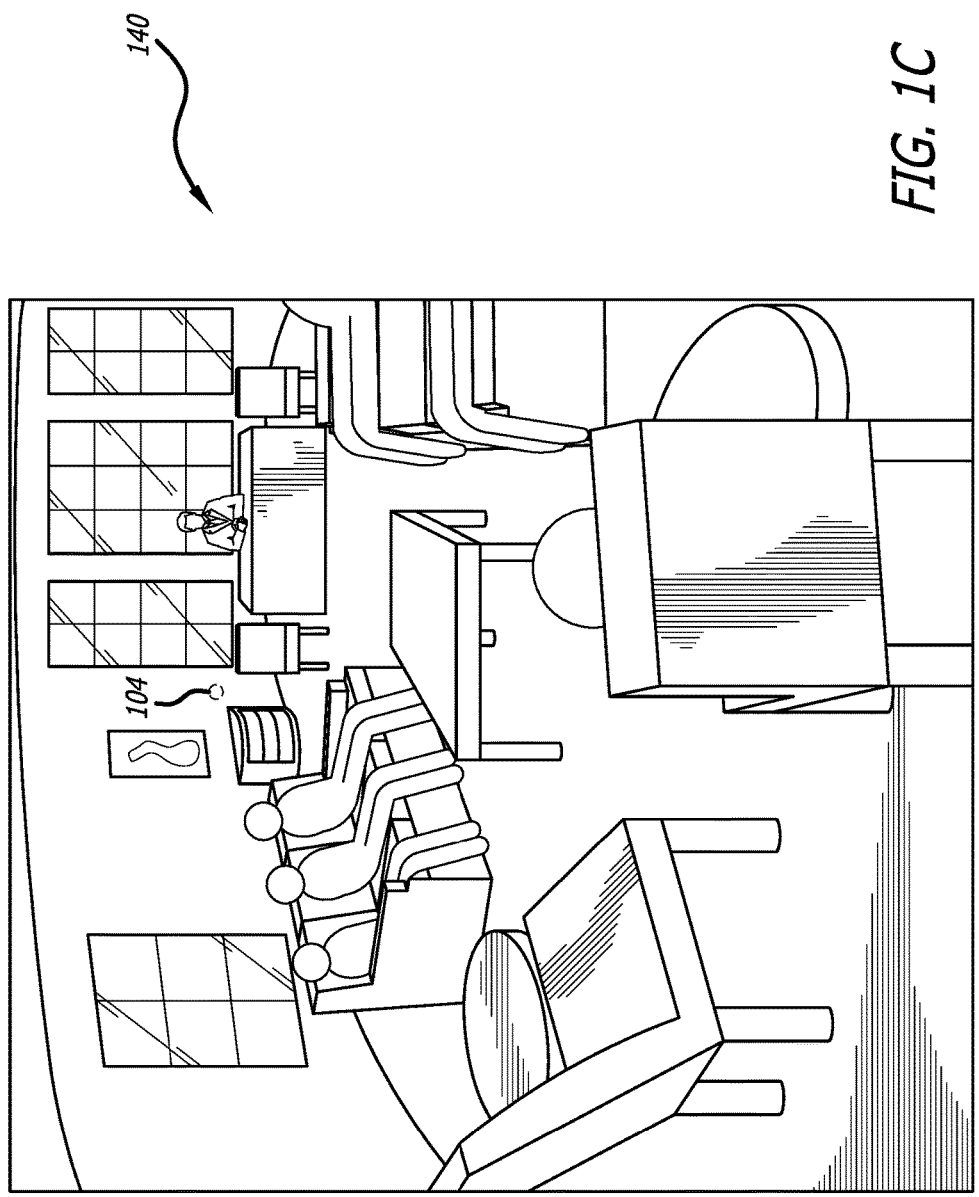

FIGS. 1A-1C illustrate example situation 100 of obtaining information on persons, objects, and/or areas to be used in accordance with various embodiments. As shown in FIG. 1A, an environment 102 includes a plurality of cameras positioned to capture image data (e.g., images or video) over a period of time that sufficiently represents the environment. The period of time can correspond to, for example, the time it takes to conduct a meeting, the time it takes to record a movie, a show, or a portion thereof, the time it takes to record an event such as a concert or sporting event, etc. The environment can include, for example, any environment where cameras, microphones, or other sensors can be positioned throughout. For example, as shown in FIG. 1A, the environment includes an office or other similar setting. It should be noted that the environment is an example environment. Other environments can include movie sets, sporting events, concerts, etc. In this example, positioned in the environment are a number of objects (e.g., furniture, people, etc.). The objects can be stationary or moving, or a combination thereof. For example, people or other objects can be moving about the environment.

The cameras can be, for example, high-definition cameras such as 4K cameras capable of capturing images, video, and/or audio. It should be noted that other cameras can be as well, as may include cameras of having a different. The cameras can be positioned to capture image data at different angels of the environment. For example, cameras 104, 106, 108, and 110 are positioned to capture image data at different angles around environment 102. It should be noted that other arrangements of the cameras can be considered, and the arrangement shown is merely for illustration purposes. In accordance with an embodiment, the cameras can capture 1920×1080 pixels at sixty frames per second. An example number of cameras can be ten. However more or fewer cameras can be used in accordance with various embodiments.

The system can receive audio data captured over the period of time by a plurality of microphones spatially arranged throughout the environment. The audio data can represent sounds in or proximate to the environment. For example, the audio data can include sounds occurring in and/or outside the environment. The microphones can be, for example, any device configured to convert sound in air into an electrical signal. In some situations, the microphones can be included in other devices, such as the cameras or objects positioned throughout the environment. The microphones can be positioned substantially in the same location as the cameras, a different location, or a combination thereof. For example, as shown in FIG. 1A, microphones 112, 114, and 116 positioned throughout the environment in different locations than the cameras.

The environment can include an infrared (IR) transmitter that emits IR light. The IR transmitter can emit at a designated period of time an infrared pulse. The infrared pulse can be detected simultaneously by each of the cameras. In response to detecting the infrared pulse, the cameras can be synchronized such that image capture by the cameras is synchronized. The environment can further include an audio generating component. The audio generating component can emit at the designated period an audio pulse that can be detected by the microphones. The audio pulse can be configured to be detected by the microphone and not by humans. In response to detecting the audio pulse, the microphones can be synchronized during audio capture to capture audio at substantially the same time.

As described, and as will be described further herein, the images captured from the camera are from various viewpoints and can be used to generate a three-dimensional virtual environment. For example, situation 120 of FIG. 1B illustrates a representation of image data captured by camera 104. The camera and other cameras can capture image data over a range of angles. For example, the cameras may capture information over a full three-hundred and sixty degree range to construct a two-dimensional or three-dimensional view of the user's surroundings. As shown in FIG. 1B, the viewpoint of the captured image data is from camera 104. In this example, the image data includes objects within the field of view of camera 104. The image data can include a representation of various objects such as people and office furniture. In some instances, cameras and/or camera crew can be removed and or the appearance of reduced from the captured image using various image processing techniques.

Example 140 of FIG. 1C illustrates a representation of image data captured by camera 108. As shown in FIG. 1C, the viewpoint of the captured image data is from camera 108. In this example, the image data includes objects within the field of view of camera 108. As shown, the image data includes a representation of various objects and people. As in example 120, the representation of cameras, camera crew, and other objects can be eliminated or at least reduced using various image processing approaches.

In accordance with various embodiments, the captured images can be stitched or otherwise combined to generate a virtual three-dimensional representation of the environment, where the three-dimensional representation can reflect changes (e.g., object movement, changes in lighting, etc.) that occurred in the environment over the period of time. This can include models of objects in the environment, as well as texture and movement data associated with the models of each object and/or components of the environment. Further, for each period of time during the period of time, audio data can be mapped to a corresponding region of the environment. Information representing the three-dimensional representation of the environment and the audio information can be encoded and stored. The information can be provided access by a user, or a device of a user, wherein the user can navigate the virtual representation of the environment from a particular view at a particular time.

Navigating the virtual environment to view different views of the environment can depend on the orientation and the angle at which the user is holding the device, as well as the direction at which the user is pointing the device. In some embodiments, the device may display a planar view or bird's eye view of the user's surroundings, similar to how conventional two-dimensional maps are displayed. Some embodiments may generate a display that includes three-dimensional images captured from the surroundings. In some instances, the device displays images in a way as if the user were looking through a window, enabling the user to see an augmented reality of the user's surroundings on the display screen of the device.

Figure 2A:
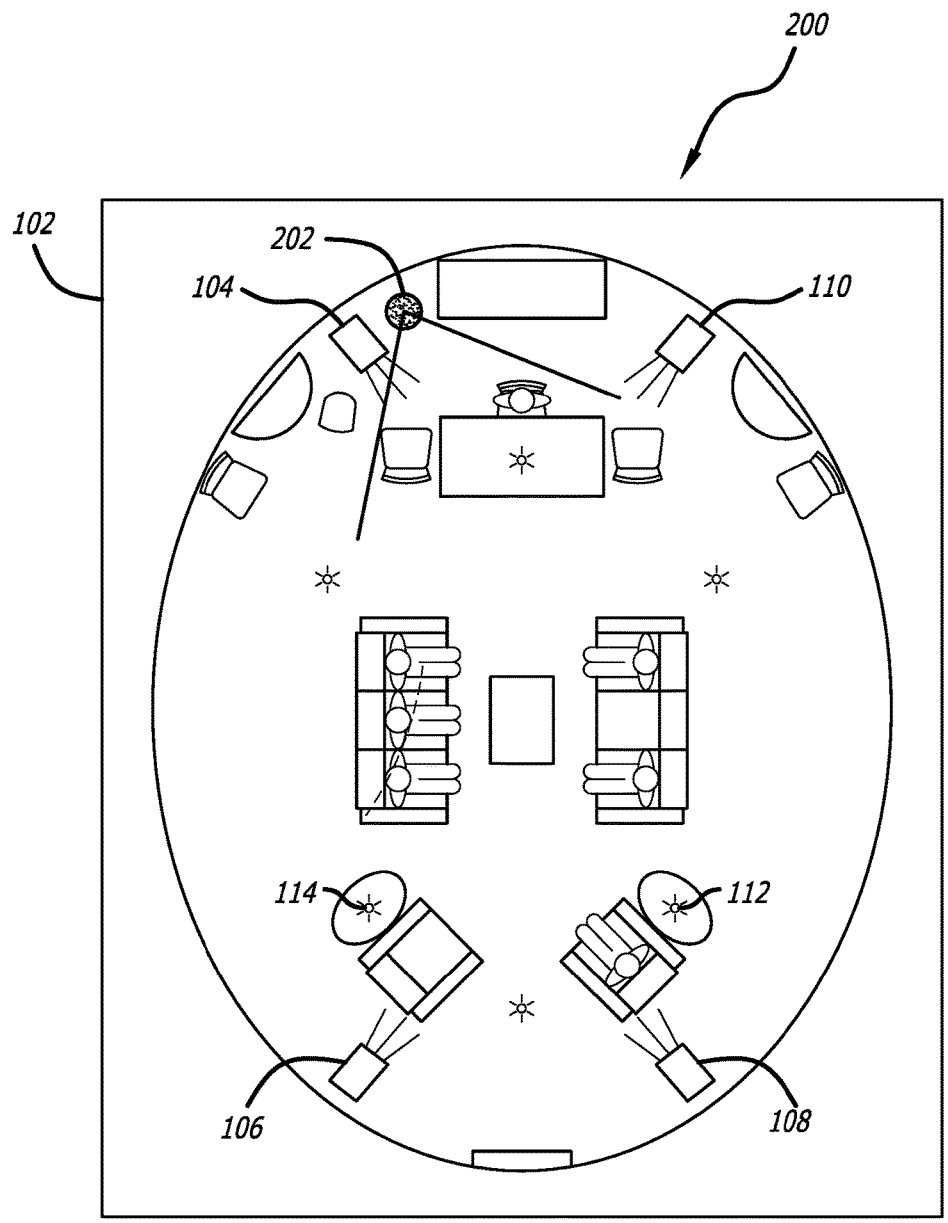
FIGS. 2A-2D illustrate an example situation of a user of an electronic device being displayed and interacting in a virtual environment in accordance with various embodiments.

For example, FIGS. 2A-2D illustrate example displays of a virtual environment. In accordance with an embodiment, situation 200 of FIG. 2A illustrates a first point of reference 202 to view a representation of the virtual environment. This example illustrates what the user of the electronic device sees on the display screen of the device when the user is holding the device substantially parallel to the floor (e.g., within a threshold angle). As shown, the device displays a two-dimensional view (e.g., bird's eye view) of the user's location within the area and the desired information. In some embodiments, the device displays the three-dimensional view when the device is held beyond a threshold angle (e.g., the device is held at an angle exceeding 45° from being parallel to the floor). The device may alternate between the two- and three-dimensional view of the user's surroundings as the user holds the device differently (e.g., displaying a three-dimensional view when the device is tilted at an angle where the back camera(s) of the device may capture the user's surroundings and displaying a two-dimensional view when the device is held within a threshold angle (e.g., +/−20°) where the back camera(s) is substantially facing the floor). In some embodiments, the device may not switch between the two views and continue to display a three-dimensional view of the user's surrounding regardless of the angle of the device (e.g., by enabling the device to capture the surrounding images using cameras that are on the rim or the side of the device as opposed to the back of the device when the device is tilted beyond a certain angle).

As described, the information representative of the virtual environment can be provided access by a user, or a device of a user. In the situation of providing the user access, the user can navigate the virtual representation of the environment from a particular view at a particular time as if the user were looking through a window, enabling the user to see an augmented reality of the user's surroundings on the display screen of the device. For example, the user can be provide a view of the virtual environment that is based at least in part upon a current relative position and/or orientation of the viewer with respect to the device, as well as changes in that relative position and/or orientation. In this way, the device displays images in a way as if the user were looking through a window, enabling the user to see an augmented reality of the user's surroundings on the display screen of the device.

As the viewer tilts, rotates, or otherwise changes the orientation of the device, or as the viewer's relative position or orientation changes with respect to the device, the device can act like a window whereby the user can see objects "through" the device using images captured from the one or more cameras of the device (e.g., the side and back cameras). The relative movements can be based upon factors such as the distance of the viewer to the device, a direction of movement of the user, a direction of change in orientation of the device, or other such factors. The relative movements can be selected such that the view appropriately with changes in relative position and/or orientation, and thus viewing angle, of the viewer.

Figure 2B:
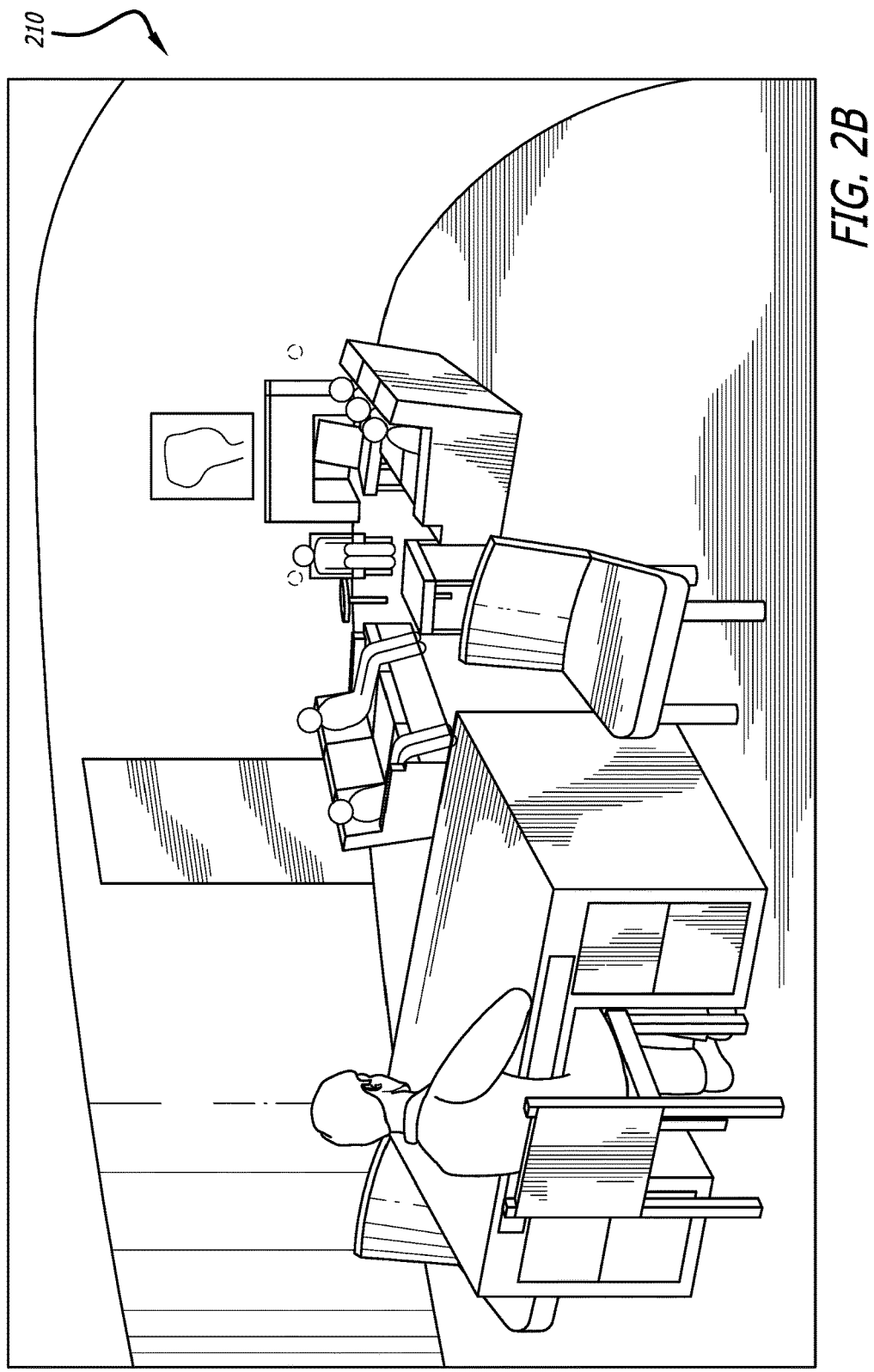
Figure 2C:
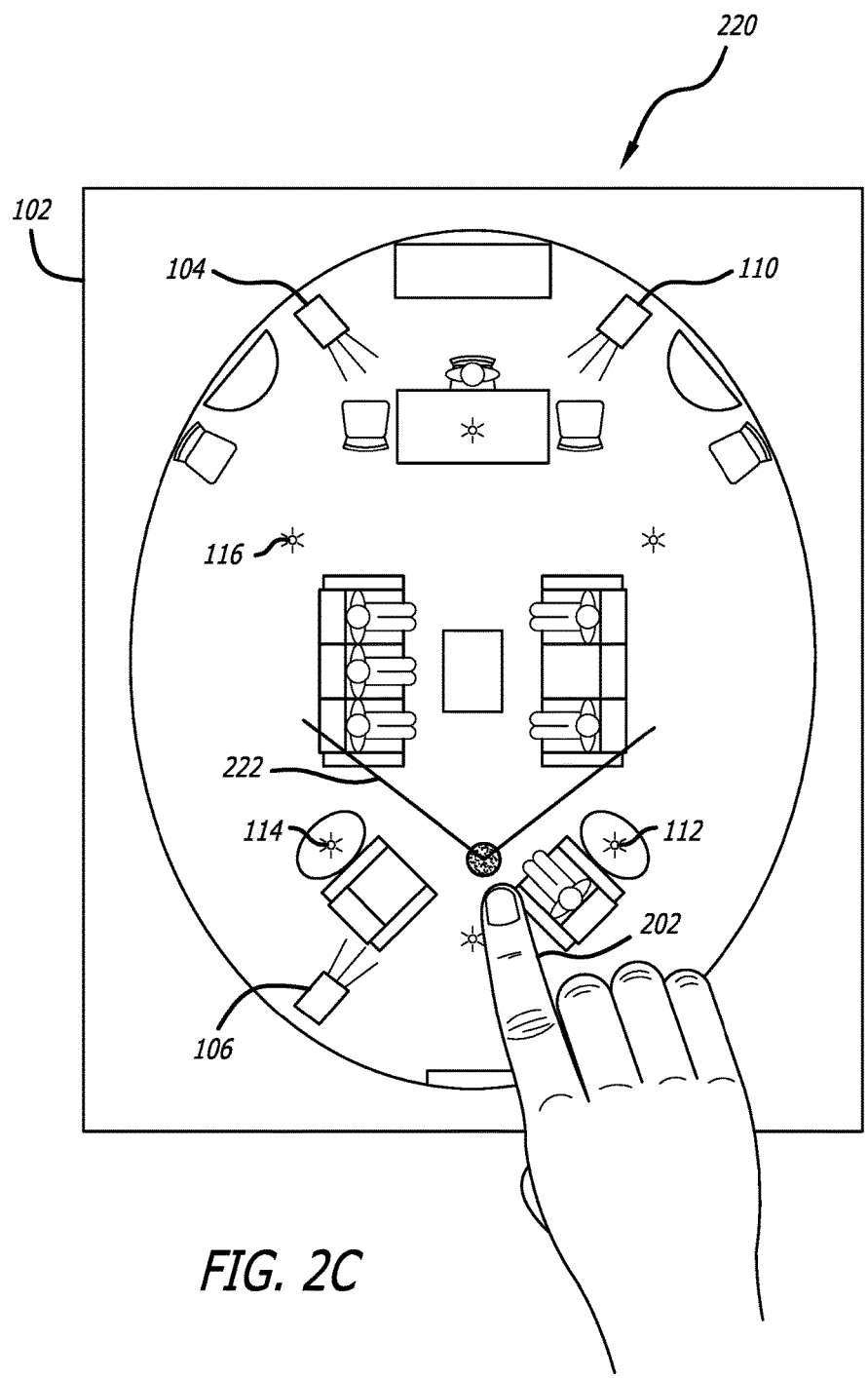

Example 210 of FIG. 2B illustrates an example of what the user of the electronic device might see on a display screen of the device when the user is holding the device upright with the display screen substantially facing the user and another face of the device facing a hallway in some embodiments (i.e., held substantially perpendicular to the floor). By holding the device in an upright manner in at least some embodiments, the device can act like a window whereby the user can see objects "through" the. As shown in FIG. 2B, the device displays a three-dimensional virtual reality of the surrounding environment that the user sees (i.e., a 180° range around the user from one side to the other). In this example, the user has substantially a 180 degree view of the environment from position 202. The device also can overlay graphical elements or other information (not shown) over the displayed image information.

In accordance with an embodiment, the user is provided the appropriate audio based on the user's view and position. As described, the audio for each period of time of the period of time, audio data is mapped to a corresponding region of the environment. In this way, the audio can be provided to the user at a volume as if the user were physically in the environment based on the user's position in the environment.

As described, the user can navigate the virtual environment to view different areas of the environment. For example, as shown in example 220 of FIG. 2C, the user has selected position 202 and can be presented a view of the environment from this position. It should be noted that the user can select any location with the environment and embodiments are not limited to the particular location shown. In this example, the device displays a two-dimensional view (e.g., bird's eye view) of the user's location within the area and the desired information. In accordance with an embodiment, some embodiments display the two-dimensional view when the device is held at certain angle (e.g., within 45° range from the floor). In other embodiments, the user can activate the two-dimensional view with one of a number of inputs such as by tapping the display screen and making an appropriate selection. The user may select the position (e.g., via keystroke, via a cursor selection, tapping the display screen), the desired target destination, and/or the object to which the user would like to view. In accordance with an embodiment, in response to the selection at 202, the user can be presented a view 222 of the environment.

Figure 2D:
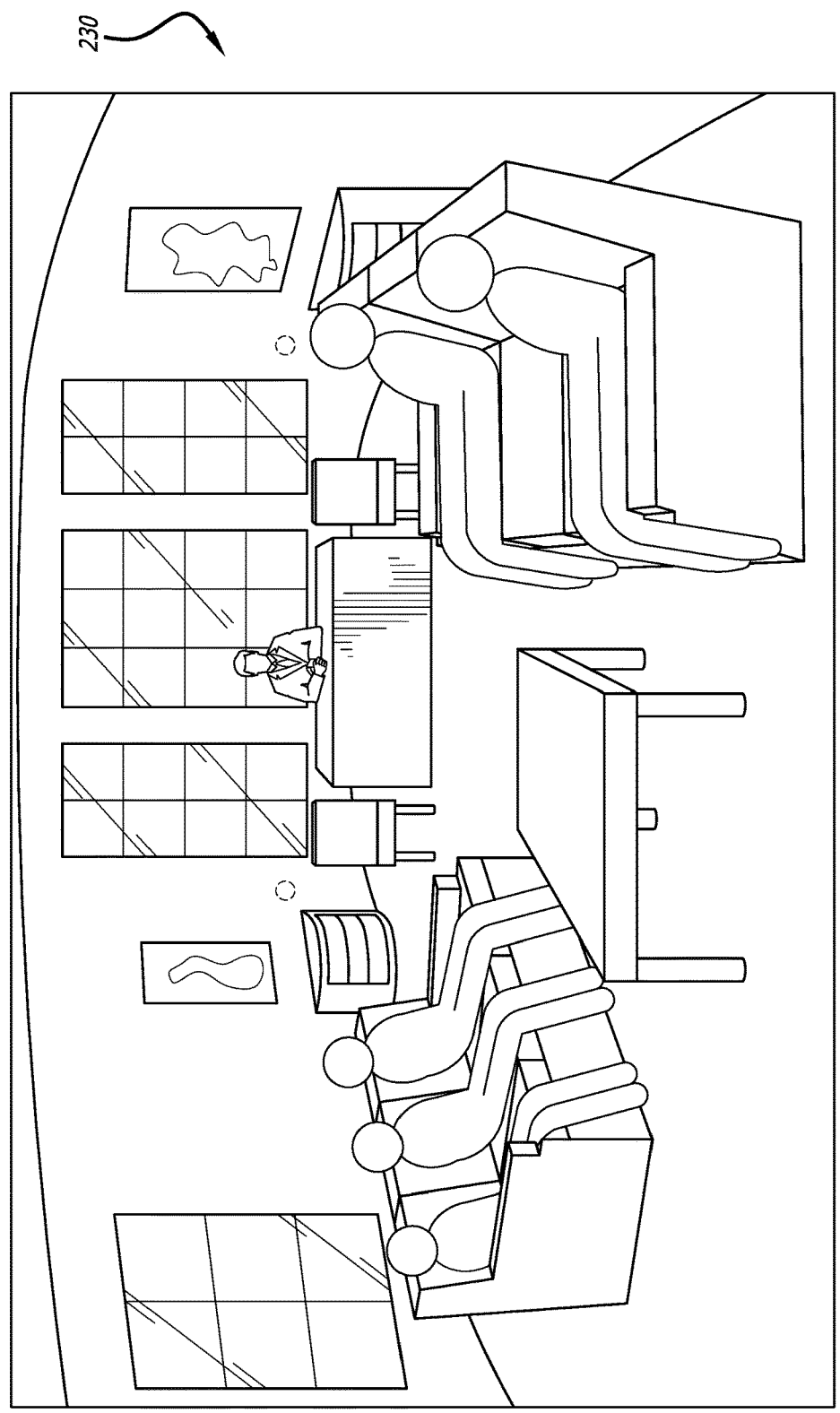

For example, the view from position 202 is shown in example 230 of FIG. 2D. As described in example 210, the device displays a three-dimensional virtual reality of the surrounding environment that the user sees (i.e., a 180° range around the user from one side to the other). In this example, the user has substantially a 180 degree view of the environment from position 202. The user is provided the appropriate audio based on the user's view and position. As described, the user can navigate the virtual representation of the environment from a particular view at a particular time as if the user were looking through a window, enabling the user to see an augmented reality of the user's surroundings on the display screen of the device.

In accordance with various embodiments, although the user is selecting a position and view of the environment by tapping a display screen of the device to indicate a desired position, the user can be provided a view of the virtual environment that is based at least in part upon a current relative position and/or orientation of the viewer with respect to the device, as well as changes in that relative position and/or orientation. In other embodiments, the virtual environment can be displayed on one device while the view can be controlled by another device. For example, the content can be displayed on a TV while the user's mobile device can be used to control a view of the content.

In accordance with various embodiments, the user can enter an interactive mode (or the interactive mode can automatically be entered in response to detecting a particular event). In the interactive mode, the physical environment can be mapped the virtual environment. As the user moves in physical environment the view of the virtual environment displayed on the device is updated. In accordance with an embodiment, mapping can include capturing a number of images and depth information of objects in the physical environment with respect to a camera in the environment. The image and depth information can be used to map the physical surrounding to information corresponding to a virtual environment. Thereafter, the user can navigate the virtual representation of the environment as if the user were looking through a window, enabling the user to see an augmented reality of the user's surroundings on the display screen of the device. In this example, the distance between objects in the physical world can be substantially similar to distance between virtual objects in the virtual environment. In this way, the user can be provide a view of the virtual environment that is based at least in part upon a current relative position and/or orientation of the viewer with respect to the device, as well as changes in that relative position and/or orientation. As such, the device displays images in a way as if the user were looking through a window, enabling the user to see an augmented reality of the user's surroundings on the display screen of the device.

In various embodiments, the relative position and/or orientation of a viewer of a computing device can be determined using at least one image capture element of the device. For example, the feed from a video camera can be analyzed to locate a relative position of the viewer in the video feed, which can be analyzed to determine the relative direction of the viewer. In other embodiments, one or more digital still cameras can capture images periodically, in response to detected movement of the viewer and/or device, or at other appropriate times, which then can be analyzed to attempt to determine viewer position, as distance can often be determined in addition to direction when analyzing multiple sources of information from different locations. Distance can be determined, for example, using stereoscopic imaging or proximity sensing, among other such options. In some embodiments, infrared (IR) imaging can be used to detect specific features of the viewer, such as the viewer's eyes, for use in determining and/or tracking the location of the viewer. In still other embodiments, changes in the orientation and/or position of the device can be determined using at least one motion sensor of the device, in order to provide for a higher sampling frequency than might otherwise be possible using the image information captured by the camera, or otherwise attempt to improve the relative position determinations. In some situations, a sensor that is remote, separate, or otherwise in communication with the device can be used to detect a change in orientation and/or position of the device. The orientation information can be received at the device from the sensor, and the device can cause the appearance of the interface to be altered based at least in part on the received orientation and/or position information. Based at least in part upon the determined direction of the viewer, the device can determine a primary viewing angle with respect to the plane of the display screen, and thus the content to be rendered and displayed on the device.

In at least some embodiments, a computing device can attempt to determine changes in the relative position, direction, and/or orientation between the viewer and device in order to update the perspective from which the displayed content is rendered or otherwise displayed as if the user were looking through a window, enabling the user to see an augmented reality of the user's surroundings on the display screen of the device. For example, the device can continue capturing and analyzing image information to attempt to determine changes in relative position of the viewer, such as may be based on movement of the viewer and/or the device. The device also can utilize information from at least one orientation or position determining element of the device, such as an accelerometer or inertial sensor, to assist in detecting motions of the device and updating the viewing angle accordingly. These elements also can detect changes in orientation of the device, such as through rotation of the device, even though the relative position between the viewer and the device might not have substantially changed. The display can be updated based at least in part upon changes in orientation as well. By adjusting the perspective from which the image content is rendered to correspond to changes in the relative viewing angle of the user, the device displays images in a way as if the user were looking through a window, enabling the user to see an augmented reality of the user's surroundings on the display screen of the device.

Figure 3:
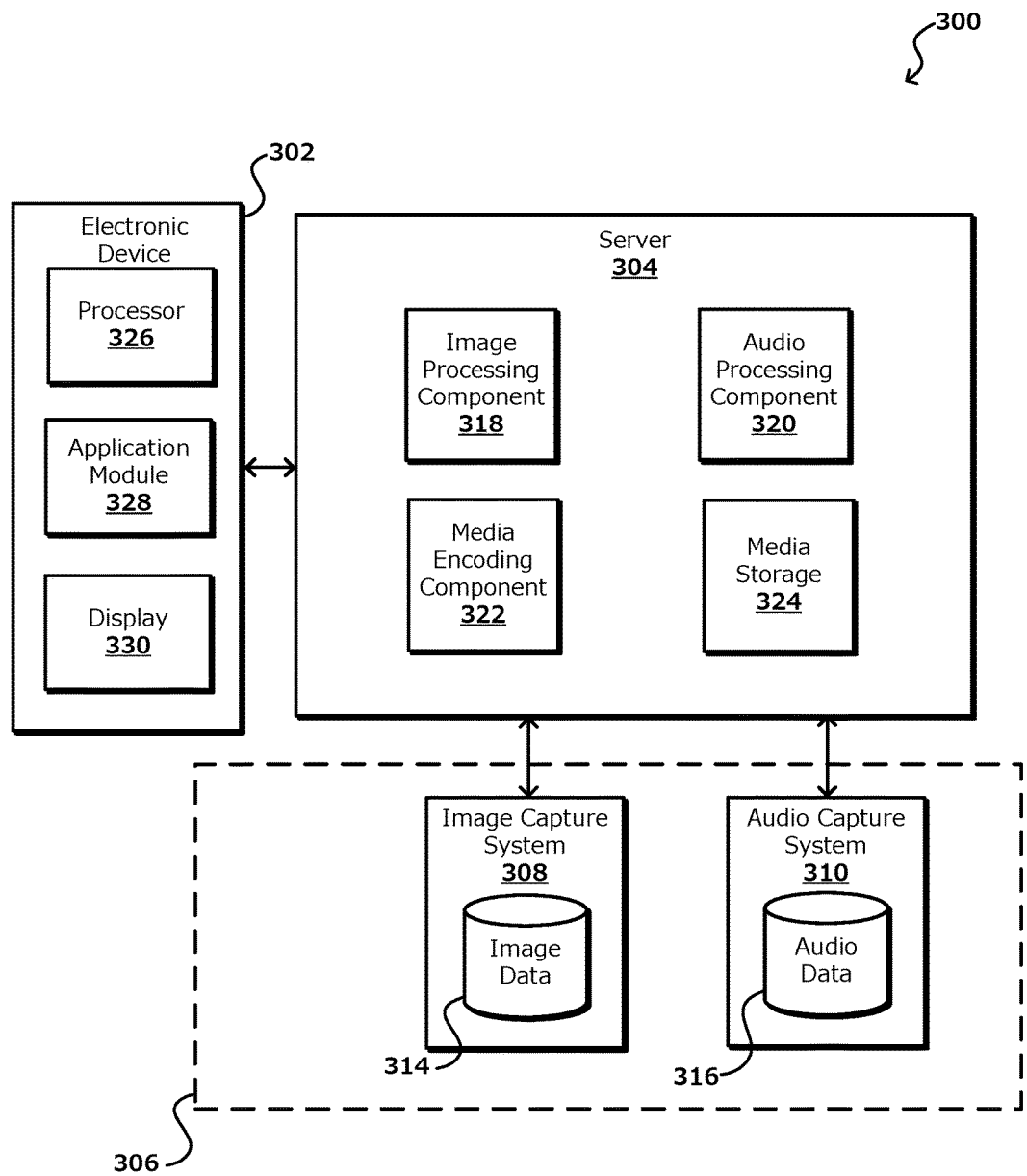
FIG. 3 illustrates a block diagram of a system for obtaining information on persons, objects, and/or areas to be used in accordance with various embodiments.

FIG. 3 illustrates a block diagram of a system 300 for obtaining and providing information on persons, objects, and/or areas to be used in accordance with various embodiments. As shown in FIG. 3, the system includes at least one electronic device 302, a server 304, and media capture service 306. The electronic device is communicatively coupled to the server and the server is communicatively coupled to the media capture service. In accordance with various embodiments, communicatively coupled can include, for example, being connected, whether directly or indirectly through intervening components and is not necessarily limited to physical connections. For instance, coupled devices are devices which are in signal communication with one another. The electronic device can include, but is not limited to, a portable communication device, a mobile communication device, a mobile computer, a smartphone, a computing pad, a tablet computer, a personal computer, a desktop computer, a laptop computer, a netbook, personal data assistants, video gaming consoles or controllers, portable media players, wearable computers (e.g., smart watches, smart glasses, etc.), televisions, or any other electronic device capable of at least accepting data, transmitting data, and executing commands associated with a search feature of the electronic device or an application of the electronic device. The server can process information acquired by the media capture service or other electronic entity and provide that information to the electronic device or other devices.

The media capture service 306 can include an image capture system 308 and an audio capture system 310. In accordance with various embodiments, the media capture service can be a web-based server, a cloud-based server, a network-based server, a system of servers or any other server or servers. The media capture service can include a processor. The processor can include one or more processors. In other embodiments, the processor can be a processing system, a computing system, or any other system that is communicatively coupled to the media capture service that can generate process image and audio data. The image capture system 308 can store image data in image data store 314. The audio capture system 310 can store image data in audio data store 316. It should be noted that the image data and audio data can be stored in the same data store.

The image capture system can include a plurality of cameras. The cameras can be, for example, high-definition cameras such as 4K cameras capable of camera images, video, and/or audio. It should be noted that other cameras can be as well as may include cameras of having a different resolution or any other image capture device. The cameras can be positioned, for example, to capture image data at different angels of the environment.

The audio capture system can include a plurality of microphones. The microphones can be spatially arranged throughout an environment to capture audio data at for different areas of the environment. The audio data can represent sounds in or proximate to the environment. For example, the audio data can include sounds occurring in and outside the environment. The microphones can be, for example, any device configured to convert sound in air into an electrical signal. In some situations, the microphones can be included in other devices, such as the cameras or objects positioned throughout the room. The microphones can be positioned substantially in the same location as the cameras, a different location, or a combination thereof.

The media capture service 306 can include other sensors and components as well. For example, the environment can include an infrared (IR) transmitter that emits IR light. The IR transmitter can emit at a designated period of time an infrared pulse. The infrared pulse can be detected substantially simultaneously by each of the cameras. In response to detecting the infrared pulse, the cameras can be synchronized such that image capture by the cameras is synchronized. The environment can further include an audio generating component. The audio generating component can emit at the designated period an audio pulse that can be detected by the microphones. The audio pulse can be configured to only be detected by the microphone and not by humans. In response to detecting the audio pulse, the microphones are synchronized during audio capture to capture audio at substantially the same time.

The image data and the audio data can be received at the server 304. The server can include an image processing component 318, an audio processing component 320, a media encoding component 322, and a data store to store the encoded data or other data. The image processing component and the audio processing component can be a server-based application, a server-based script associated with a webpage, a web-based application, or any other application which can perform image and audio processing. Those of ordinary skill in the art will appreciate that such components can control or be configured to control the processor to perform various actions. The components can be located in local storage devices (not shown), remote storage devices (not shown), or both local and remote storage devices communicatively coupled to the server.

The image processing component 318 can be configured to implement one or more algorithms to create three-dimensional model of the environment. One such approach includes, for example, decomposing the image data into a plurality of images, each image of the plurality of images being annotated with timing data and positional data, generating a first set of images that are spatially organized based at least in part on the positional data, generating a second set of images that are temporally organized based at least in part on the timing data, and stitching the first set of images and the second set of images to generate a three-dimensional representation of the environment, the three-dimensional representation reflecting changes that occurred in the environment over the period of time. A representation of one or more objects can be determined in the image data. The objects can be tracked to determine motion data and position data for the objects in the environment. A texture map of the representation of the objects can be determined. Thereafter, a three-dimensional model and textures for the environment and the objects in the environment can be generated based at least in part on the motion data, positional data, and texture map.

In another approach, the generation of three-dimensional (3D) models of objects in the environment can include, capturing three-dimensional depth data of an object from viewpoints around the object using an image sensor. In this example, the image sensor simultaneously captures two-dimensional image data where the (x, y) coordinates of the image data is preregistered to (x, y, z) coordinates of the depth data. A camera can simultaneously capture second image data of the object from each viewpoint around the object. Accordingly, features between images captured by the image sensor and the camera can be extracted and compared to determine a mapping between the camera and the image sensor. The camera, in this example, is capable of capturing higher resolution images than the image sensor. Therefore, determining the mapping between the camera and the image sensor enables higher resolution images to be mapped to a 3D location of the object captured in the depth data.

Once the mapping between the camera and the image sensor is determined, a second mapping between adjacent viewpoints can be determined for each image around the object. For example, the viewpoints can be captured from other cameras positioned in the environment. In this example, each viewpoint overlaps with an adjacent viewpoint. Therefore, features extracted from two adjacent and overlapping viewpoints are matched to determine their alignment. This process of matching an image to each of its adjacent and overlapping images is repeated for each image. Accordingly, a 3D point cloud can be generated for the object using the depth data and the images captured by the camera can be projected on the surface of the 3D point cloud using the determined mapping between each adjacent viewpoint to generate the 3D model of the object.

In another approach, image data of an object is captured from multiple viewpoints. As above, depth data of the object is captured using an image sensor that additionally captures low resolution RGB color image data not necessarily suitable to creating 3D models. Thus, second image data of the object is captured using a high resolution camera. In this example, matching features between image data from the high resolution camera of adjacent and partially overlapping viewpoints is determined. Accordingly, a mapping between adjacent viewpoints using the matching features is determined. In accordance with an embodiment, any suitable feature extraction algorithm, such as SIFT, SURF, ASG, or the like, is also used to extract these features and RANSAC is able to determine the mapping between adjacent viewpoints using these features. In this example, however, a Euclidian mapping technique is used and a projective mapping technique is used to determine the mapping between the low resolution image data and the high resolution image data.

Accordingly, the imaged data or images of adjacent viewpoints are registered into a single reference frame to generate the surface or texture of the 3D model. As described above, the 3D model is generated, in part, by registering neighboring viewpoints captured from the high resolution camera where the 3D depth data was obtained by matching low resolution images captured by sensor to the high resolution images captured by high resolution camera. Alternatively, an image capture element simultaneously capturing depth data and high resolution image data (thus, obviating the need to match features between low resolution images and high resolution images to obtain the depth data) could be provided. Accordingly, such an image capture element could make use of the teachings described above to generate a 3D model by registering neighboring viewpoints.

In accordance with various embodiments, the audio processing component 320 can be configured to receive audio data captured over the period of time by a plurality of microphones spatially arranged throughout the environment; and map for a number of time periods during the period of time the audio data to a corresponding region of the environment. In this way, the audio can be provided to the user at a volume as if the user were physically in the environment based on the user's position in the environment. The audio data can represent sounds in or proximate to the environment. For example, the audio data can include sounds occurring in and outside the environment. Mapping can include determining the user's position in the virtual environment relative to each one of the microphones and providing audio based on the user's position and viewing direction.

The media encoding component 322 can encode the models and textures, along with motion and position information, for storage and playback. The information can be stored in any number of different formats including streaming formats and other storage formats. The encoded data can be provided to the electronic device. In some situations, providing the encoded data can include streaming the data to a user's device. In other situations, providing the encoded data can include providing for download the encoded data. In certain situations, a combination of streaming and downloading of the data can be implemented.

In accordance with various embodiments, the server can be communicatively coupled to the electronic device via a communication interface (not shown). The communication interface can include a peer-to-peer (P2P) interface, a Bluetooth® interface, a near-field-communication (NFC) interface, a near-field-communication-peer-to-peer (NFC P2P) interface, a Wi-Fi interface, an internet-interface, or any other interface which allows the electronic device to transmit and receive information from the server.

The server can be a web-based server, a cloud-based server, a network-based server, a system of servers or any other server or servers. The server can include a processor.

The processor can include one or more processors. In other embodiments, the processor can be a processing system, a computing system, or any other system that is communicatively coupled to the server that can generate reminders and other information and can transmit at least one of the reminders, information, etc., to the electronic device.

The electronic device can include a processor 326, an application module 328, and a display 330. The processor can include one or more processors. In other embodiments, the processor can be a processing system, a computing system, or any other system that is communicatively coupled to the electronic device that can receive and process requests.

The application module can be communicatively coupled to the processor. The application module can be, for example, a media display application, a web browser application, a search application, a database application, mobile application, web application (e.g., web app) or any other module by which the user can interact with one or more applications. Those of ordinary skill in the art will appreciate that such modules can control or be configured to control the processor to perform various actions. The module can be located in local storage devices (not shown), remote storage devices (not shown), or both local and remote storage devices communicatively coupled to the electronic device.

The display can display graphical information, as may include a virtual environment, web content, graphical interfaces, or any other graphical information. The display can be a touchscreen display, a liquid crystal display (LCD), a light emitting diode display (LED), an active matrix organic light emitting diode display (AMOLED), or any other display on which graphical information can be displayed.

In accordance with an embodiment, the processor can be configured to receive a request indicating a first location and a first view direction in the virtual environment; determine a first view to provide to the user based at least in part the first location and the first view direction; determine audio to be provided based at least in part on the first view; and provide information indicative of the first view and the audio to the user determine a change from the first location to a second location; update the first view and the audio based at least in part on the second location.

In accordance with an embodiment, the processor can receive initial models and textures of the environment. The information can be received at multiple resolutions, or a single relatively low-resolution model with initial motion data, then higher resolution models as bandwidth allows, to increase fidelity. An initial camera position, either based on 'recommended' camera position in the scene (e.g., if provided by a director or otherwise indicated in the received information) or the center point in the room (or some other default reference point). The motion data synchronized with audio can be received and the processor can cause the scene from the user-selected viewpoint to be rendered in real-time. Thereafter, the user can modify the viewpoint, either by moving physically (if using a motion-tracked device such as a virtual reality (VR) headset or a mobile phone) or by using controls on-screen (e.g., using a more traditional video delivery device, either mobile or television). The scene can be rendered from the continuously updating user viewpoint, providing an immersive experience. In various embodiments, the processor can receive one or more commands to pause, fast-forward, rewind, etc. to allow for exploration of the scene.

Figure 4:
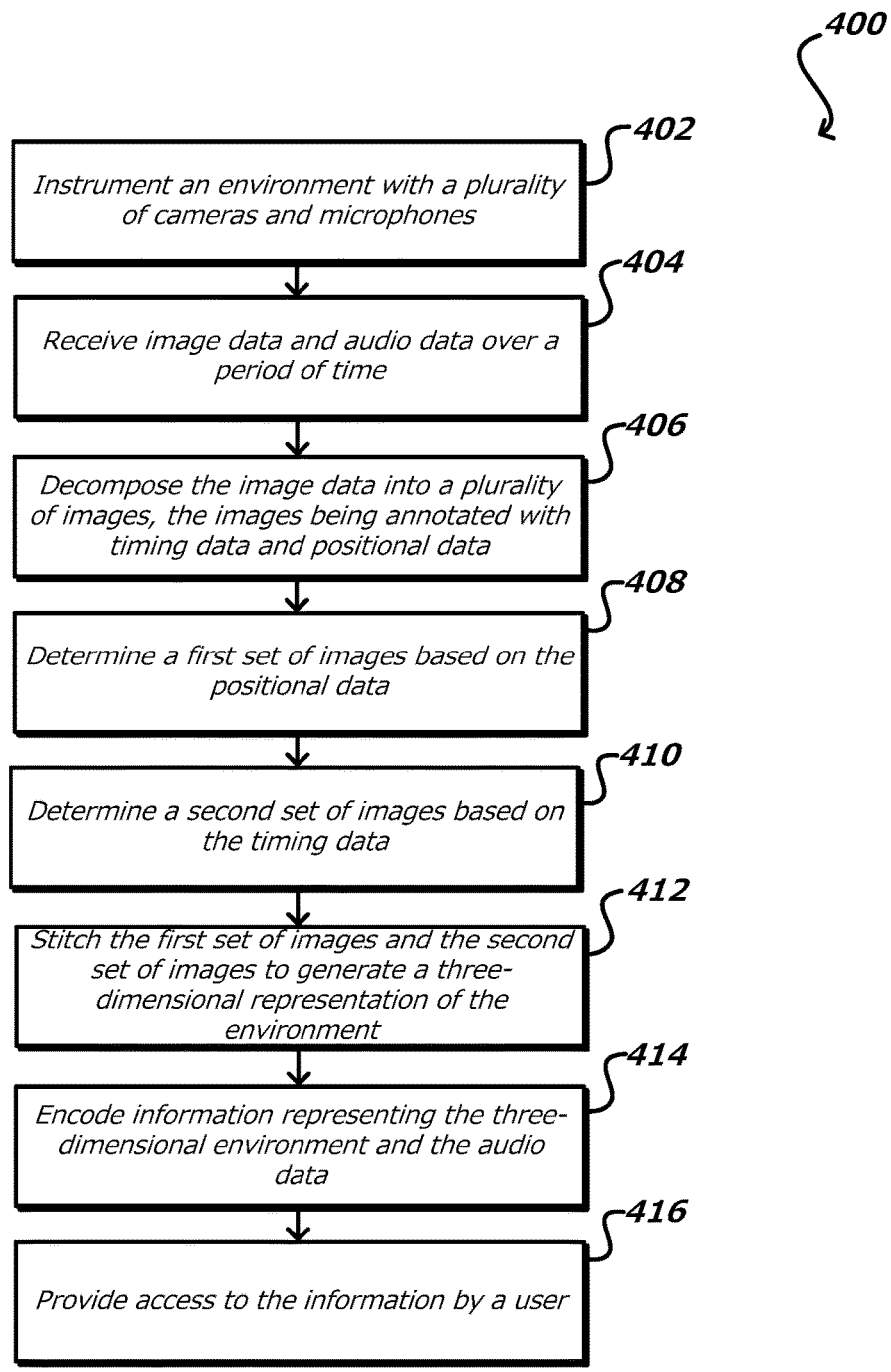
FIG. 4 illustrates an example process for capturing information on persons, objects, and/or areas to be used in accordance with various embodiments.

FIG. 4 illustrates an example process for capturing information on persons, objects, and/or areas to be used in accordance with various embodiments. While the example process 400 is illustrated with a particular order of steps, those of ordinary skill in the art will appreciate that FIG. 4 and the steps illustrated therein can be executed in parallel (e.g., at the same time) or in any order that accomplishes the technical advantages of the present disclosure and can include fewer or more steps than illustrated. An environment can be instrumented 402 with a plurality of cameras and microphones. The cameras can be, for example, high-definition cameras such as 4K cameras capable of camera images, video, and/or audio. It should be noted that other cameras can be as well as may include cameras of having a different resolution or any other image capture device. The cameras can be positioned, for example, to capture image data at different angels of the environment. The microphones can be spatially arranged throughout an environment to capture audio data at for different areas of the environment. The audio data can represent sounds in or proximate to the environment. For example, the audio data can include sounds occurring in and outside the environment. The microphones can be, for example, any device configured to convert sound in air into an electrical signal. In some situations, the microphones can be included in other devices, such as the cameras or objects positioned throughout the room. The microphones can be positioned substantially in the same location as the cameras, a different location, or a combination thereof.

Image and audio data captured over a period of time can be received 404. In accordance with an embodiment, the image data can be captured by the plurality of cameras positioned to capture images that sufficiently represent an environment (e.g., a movie set, scene, office setting, etc.) The system can receive audio data captured over the period of time by a plurality of microphones spatially arranged throughout the environment. The image data can be decomposed 406 into a plurality of images, each image of the plurality of images being annotated with timing data and positional data. A first set of images that are spatially organized can be determined 408 based at least in part on the positional data. A second set of images that are temporally organized can be determined 410 based at least in part on the timing data. The first set of images and the second set of images can be stitched 412 to generate a three-dimensional representation of the environment, the three-dimensional representation reflecting changes that occurred in the environment over the period of time. Information representing the three-dimensional representation of the environment and the audio information can be encoded 414 and stored. A user or a device of a user can be provided 416 access to the information, wherein the user can navigate the virtual representation of the environment from a particular view at a particular time.

Figure 5:
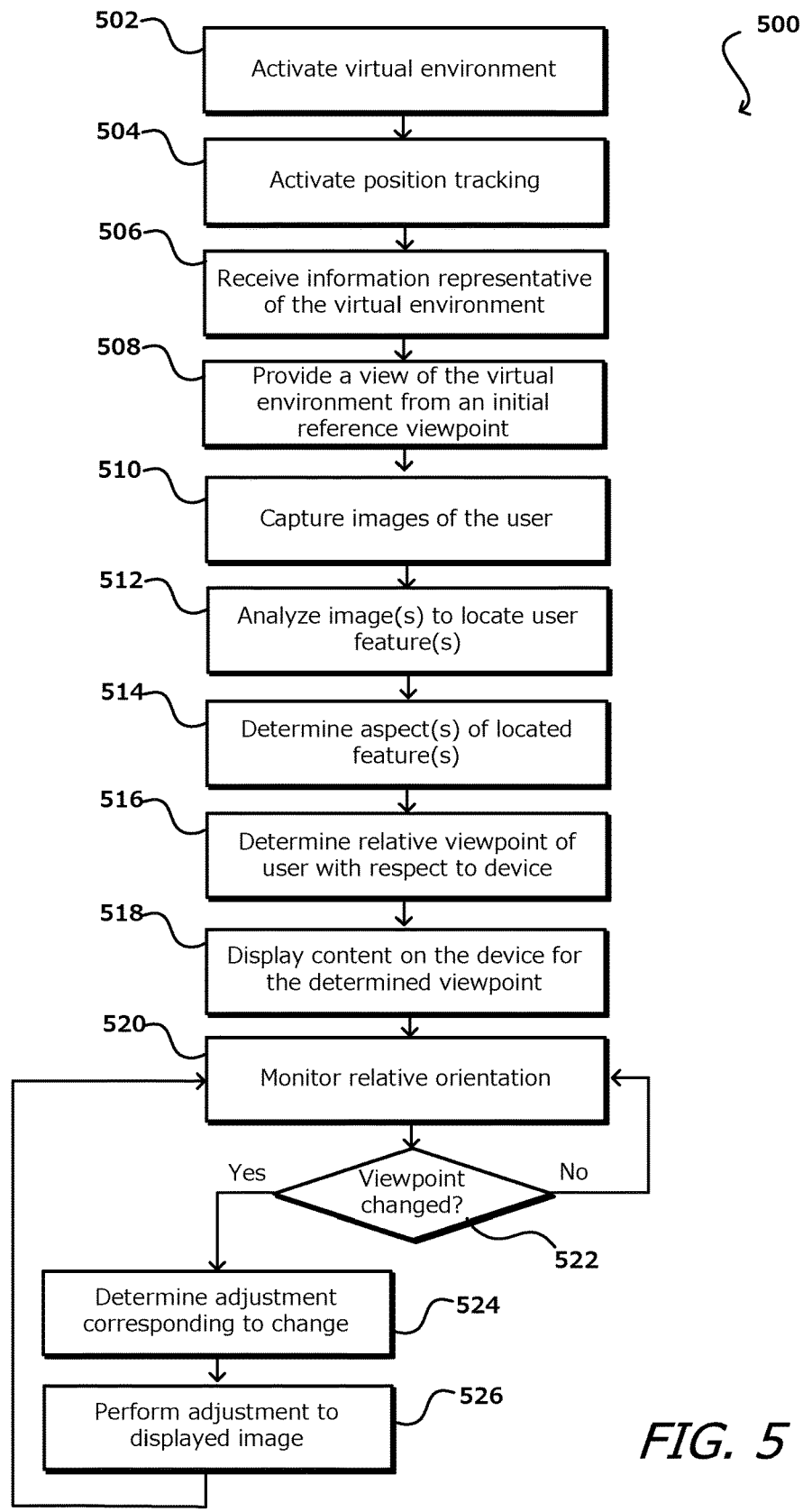
FIG. 5 illustrates an example process for playback of information captured on persons, objects, and/or areas to be used in accordance with various embodiments.

FIG. 5 illustrates an example process for playback on information captured on persons, objects, and/or areas to be used in accordance with various embodiments. In this example, a virtual environment is activated 502 on a computing device. In some embodiments a user may activate this mode manually, while in other modes the device can activate the mode automatically when a person is detected nearby. Other modes of activation are possible as well, such as upon a user opening a specific application on the device. In response to activating the virtual environment mode, position tracking of a viewer is activated 504 on the device. Information representative of the virtual environment can be received 506 at the device. The user can be provided 508 a view of the virtual environment from an initial reference or default view point. As described, the user can navigate the virtual representation of the environment from a particular view at a particular time as if the user were looking through a window, enabling the user to see an augmented reality of the user's surroundings on the display screen of the device.

For example, a camera of the device can capture 510 still images or video of a user of the device. In some embodiments, the imaging will involve ambient light image or video capture, while in other embodiments a device can utilize infrared imaging, heat signature detection, or any other such approach. The device can analyze 512 the captured images to attempt to locate features of a user, or at least a person nearby, where those features in some embodiments include at least the eyes, nose, or head of a user. In some embodiments, the device will attempt to locate an object that is shaped like a human head and that contains two eye-like features. In other embodiments, facial recognition or any other such algorithm can be used to attempt to determine the presence of a human head, or other portion or feature of a user, in the field of view of at least one of the imaging elements.

Once the user features are located, the device can attempt to determine 514 aspects or information relating to those features such as the approximate location and size of the user's head or face. In this example, the determined aspects can be used to attempt to determine 516 a relative orientation between the device and the user, as well as the orientation of those features relative to the device in at least some embodiments, which can be useful in determining information such as a viewing location of a user. For example the viewing locating of the user can be determined using the information (e.g., the positions of the user's eyes, pupils, head, or other such features), which can be indicative of at least a general point of view. Software executing on the computing device (or otherwise in communication with the computing device) can obtain information such as the angular field of view of the camera, the zoom level at which the information is currently being captured, and any other such relevant information, which can enable the software to determine an approximate direction of at least one of the user's eyes with respect to the camera. In many embodiments, direction information will be sufficient to provide adequate point-of-view dependent rendering.

Image content (e.g., images, text, planes of content, etc.) can be displayed 518 based on the determined viewing location of the user. The user can be provided a view of the virtual environment that is based at least in part upon a current relative position and/or orientation of the viewer with respect to the device, as well as changes in that relative position and/or orientation. In this way, the device displays images in a way as if the user were looking through a window, enabling the user to see an augmented reality of the user's surroundings on the display screen of the device. As the viewer tilts, rotates, or otherwise changes the orientation of the device, or as the viewer's relative position or orientation changes with respect to the device, the device can act like a window whereby the user can see objects "through" the device using images captured from the one or more cameras of the device (e.g., the side and back cameras). The relative movements can be based upon factors such as the distance of the viewer to the device, a direction of movement of the user, a direction of change in orientation of the device, or other such factors. The relative movements can be selected such that the view appropriately with changes in relative position and/or orientation, and thus viewing angle, of the viewer.

The determined aspects of the user then can be monitored 520 over time, such as by continuing to capture and analyze image information to determine the relative position of the user and/or orientation of the device. In at least some embodiments, an orientation-determining element such as an accelerometer or electronic gyroscope can be used to assist in tracking the relative location of the user and/or current relative orientation of the device. A change in the aspect, such as a change in position or orientation, can be determined 522, and the device can determine 524 whether that change requires an adjustment to the image to be displayed. For example, an application might require the device to be rotated a minimum amount before adjusting the displayed image content, such as to account for a normal amount of user jitter or other such movement that may not be intended as input. Similarly, certain embodiments might not utilize continuous rotation, but might change views upon certain degrees of change in relative orientation of the device and/or a position of the user relative to the device. If the orientation change is sufficient to warrant an adjustment, the device can determine and perform 526 the appropriate adjustment to the content, such as to provide the user a different view of the environment.

Figure 6:
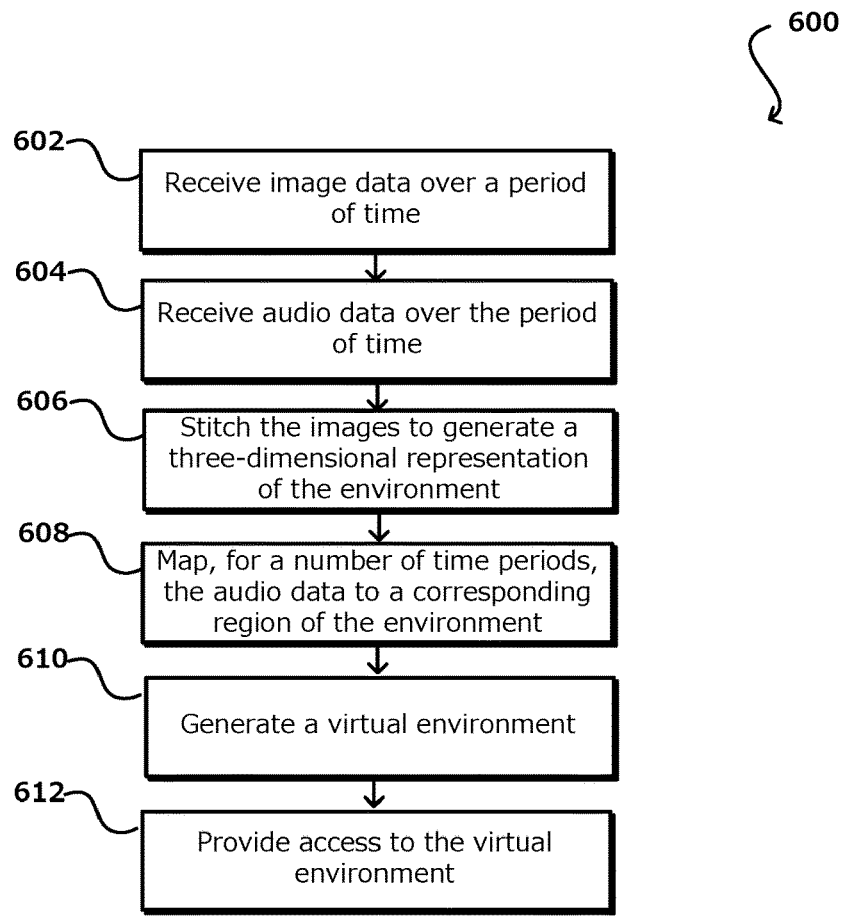
FIG. 6 illustrates an example process for providing a virtual environment in accordance with various embodiments.

FIG. 6 illustrates an example process for providing three-dimensional content to be used in accordance with various embodiments. In this example, image data captured over a period of time can be received 602 at a remote server. The image data being captured by a plurality of cameras positioned to capture images that sufficiently represent an environment. Audio data captured over the period of time by a plurality of microphones spatially arranged throughout the environment can be received 604 at the server. The images can be stitched 606 together to generate a three-dimensional representation of the environment, the three-dimensional representation reflecting changes that occurred in the environment over the period of time. For a number of time periods during the period of time the audio data can be mapped 608 to a corresponding region of the environment. A virtual representation of the environment can be generated 610 based at least in part on the stitched images and mapped audio data. Thereafter, a virtual representation of the environment can be provided 612 for access by a user, wherein the user can navigate the virtual representation of the environment from a particular view at a particular time.

Figure 7:
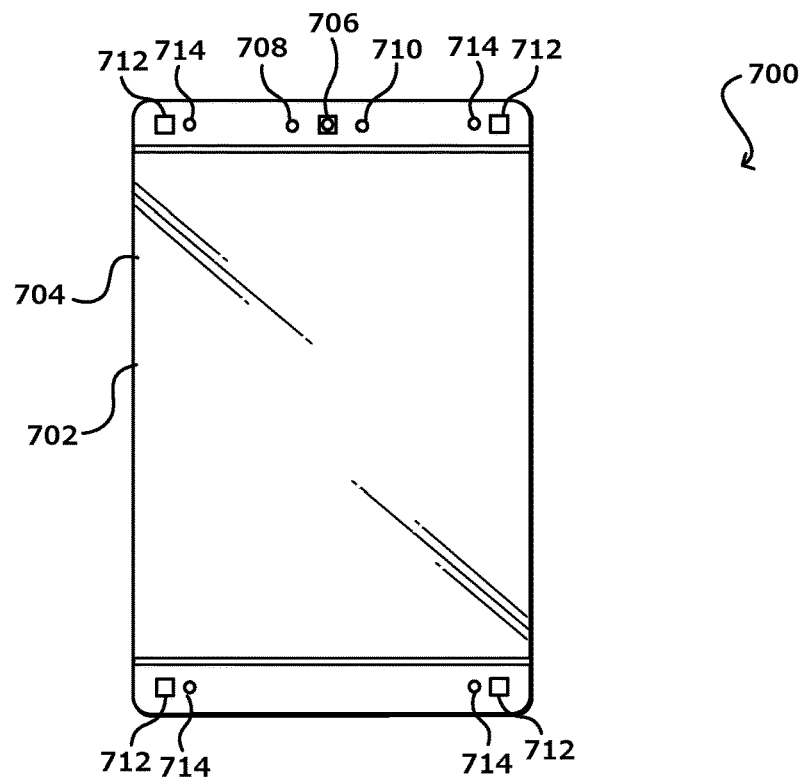
FIG. 7 illustrates an example computing device that can be utilized in accordance with various embodiments.
Figure 8:
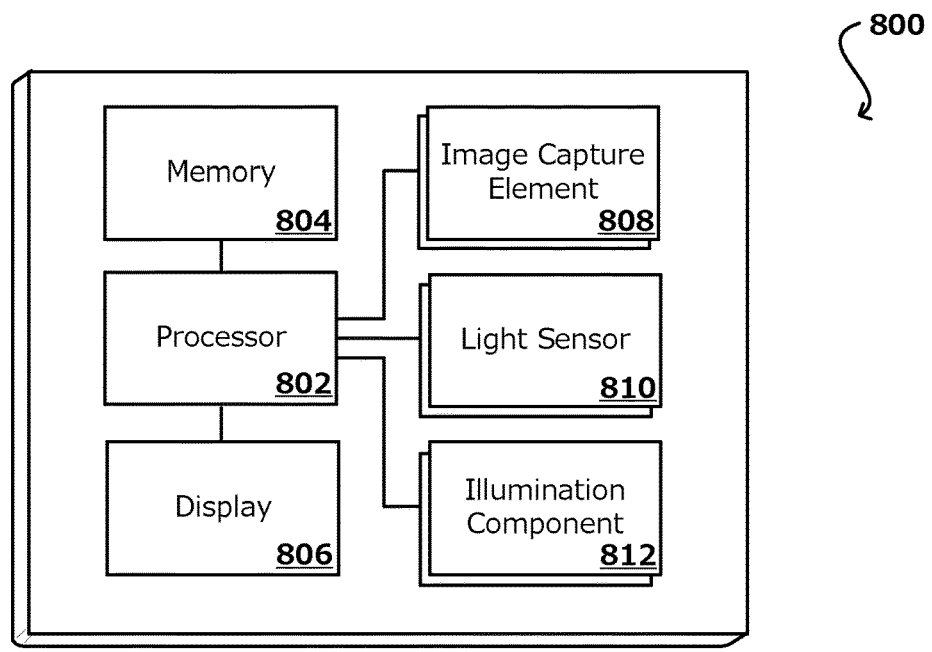
FIG. 8 illustrates an example set of basic components of a portable computing device, such as the device described with respect to FIG. 7.

FIG. 7 illustrates a front view 700 of an example computing device 702 that can be used to perform methods in accordance with various embodiments discussed and suggested herein. In this example, the device has a front-facing camera 706 (i.e., a camera on the same side of the device as a display screen 704) that can be used for purposes such as video conferencing. Along with the camera, the device can also have elements such as a light sensor 708 for determining an amount of ambient light around the device, and a white light LED 710 or other such light source capable of operating as a flash, or otherwise providing light for the front-facing camera 706. The computing device also includes four camera sensors 712, which in this example can have a lower resolution, power requirement, and/or color depth than the front-facing camera 706. Such sensors can be used for purposes such as head tracking and gesture input, for example, which can require image data to be captured over a period of time but do not require full or higher resolution images. Along with each (or at least some) of these camera sensors 712 can also be a light source, such as an IR LED 714, that can emit IR that, when reflected, can be directed back toward at least the associated camera sensor 712. Placing the LEDs near the sensors can have the advantage that objects, such as human eyes, that function as retro-reflectors can enable those objects to be detected by the adjacent sensors in the captured image data. In at least some embodiments, the distance between a camera sensor and an LED can be at least 1-2 mm. It should be understood that reference numbers for similar elements can be used within a figure, or carried over between figures, for purposes of explanation and ease of understanding, but that such use should not be read as a limitation on the scope of the various embodiments unless otherwise stated.

In order to provide various functionality described herein, FIG. 7 illustrates an example set of basic components of a computing device 700, such as the device 702 described with respect to FIG. 7. In this example, the device includes at least one central processor 802 for executing instructions that can be stored in at least one memory device or element 804. As would be apparent to one of ordinary skill in the art, the device can include many types of memory, data storage or non-transitory computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least two image capture elements 808, such as two or more cameras (or at least one stereoscopic camera) that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example computing device includes at least one light sensor 810 which determine the need for light when capturing an image, among other such functions. The example device 800 includes at least one illumination component 812, as may include one or more light sources (e.g., white light LEDs, IR emitters, or flash lamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The device also can include at least one orientation or motion sensor. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor, whereby the device can perform any of a number of actions described or suggested herein.

Figure 9:
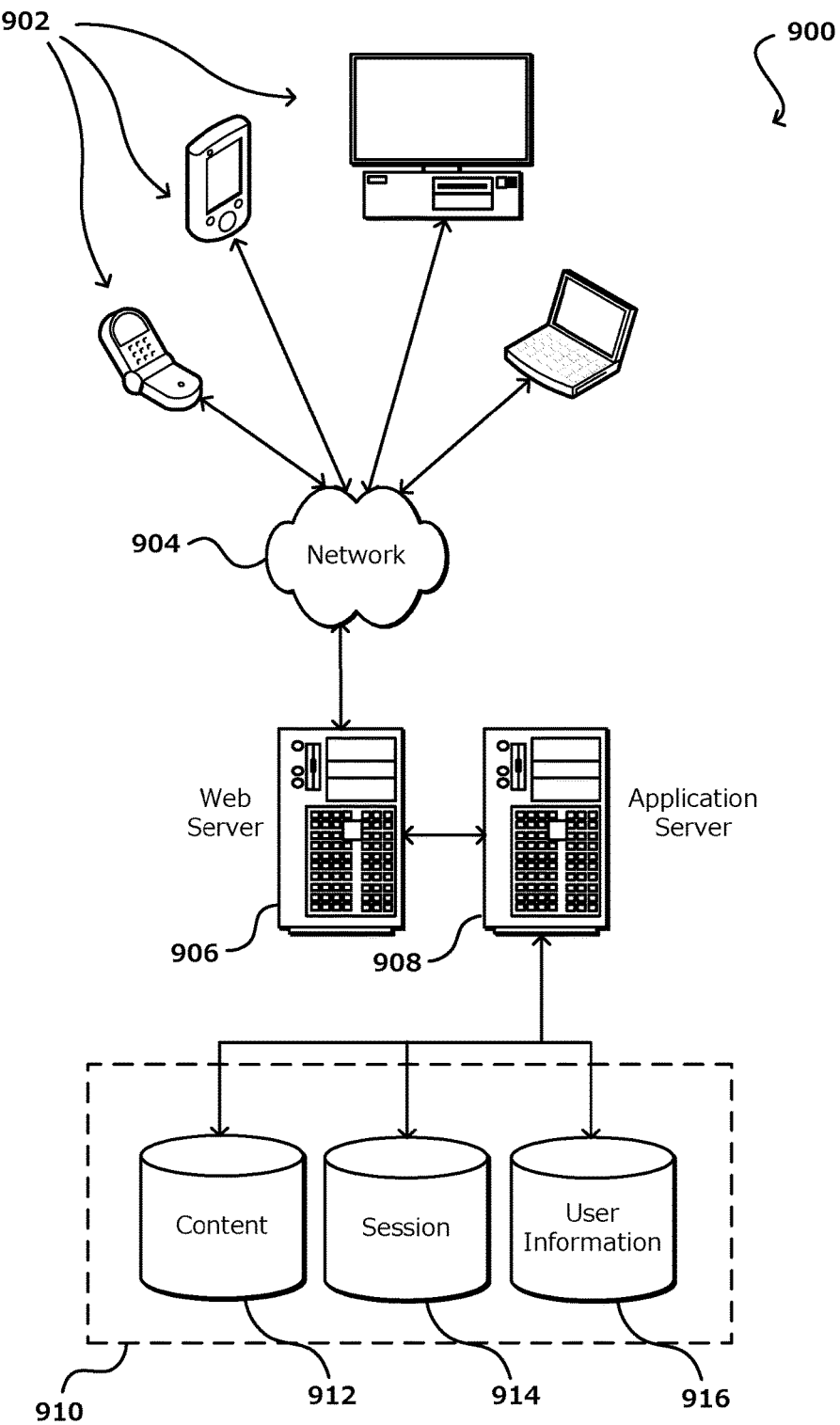
FIG. 9 illustrates an example environment in which aspects of the various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   a processor; and
   a memory having computer-executable instructions that, when executed by the processor, cause the processor to:
   receive image data captured over a period of time, the image data being captured by a plurality of cameras positioned to capture images that sufficiently represent an environment;
   receive second image data captured over the period of time, the second image data being captured by an image sensor, including depth data and low resolution image data;
   receive audio data captured over the period of time by a plurality of microphones spatially arranged throughout the environment;
   stitch the images to generate a three-dimensional representation of the environment, the three-dimensional representation reflecting changes that occurred in the environment over the period of time;
   map, based at least in part on respective locations of the plurality of microphones and for a number of time periods during the period of time, portions of the audio data to a region of the environment; and
   provide access to a virtual representation of the environment by a user, wherein the user can navigate the virtual representation of the environment from a particular view and region at a particular time, and wherein respective portions of the audio data are presented based at least in part on the particular view, a relative position of the user with respect to the particular view corresponding to a view direction, and the region at the particular time in the virtual representation of the environment.

2. The computing system of claim 1, wherein the instructions when executed further enable the computing system to:
   receive a request indicating a first location and a first view direction in the virtual representation environment;
   determine a first view to provide to the user based at least in part the first location and the first view direction;
   determine audio to be provided based at least in part on the first view; and
   provide information indicative of the first view and the audio to the user.

3. The computing system of claim 2, wherein the instructions when executed further enable the computing system to:
   determine a change from the first location to a second location; and
   update the first view and the audio data based at least in part on the second location.

4. The computing system of claim 3, wherein the instructions when executed further cause the computing system to:
   emit at a designated period an infrared pulse and audio pulse;
   detect the infrared pulse and the audio pulse;
   synchronize image capture and audio capture.

5. A computing system, comprising:
   a processor; and
   a memory having computer-executable instructions that, when executed by the processor, cause the processor to:
   receive image data captured over a period of time, the image data being captured by a plurality of cameras positioned to capture images that sufficiently represent an environment;
   receive second image data captured over the period of time, the second image data being captured by an image sensor, including depth data and low resolution image data;
   receive audio data captured over the period of time by a plurality of microphones spatially arranged throughout the environment;
   generate a three-dimensional representation of the environment;
   map, based at least in part on respective locations of the plurality of microphones and for a number of time periods during the period of time, portions of the audio data to a region of the environment;
   receive a view direction and position; and
   provide a virtual representation of the environment as represented over the period of time based at least in part on the view direction and the position, wherein respective portions of the audio are presented based at least in part on the view direction, a relative position of the user with respect to the particular view corresponding to a viewing direction, and particular region for a particular time in the virtual representation of the environment.

6. The computing system of claim 5, wherein the instructions, when executed further enable the computing system to:
   decompose the image data into a plurality of images, each image of the plurality of images being annotated with timing data and positional data;
   generate a first set of images that are spatially organized based at least in part on the positional data;

generate a second set of images that are temporally organized based at least in part on the timing data; and stitch the first set of images and the second set of images to generate a three-dimensional representation of the environment, the three-dimensional representation reflecting changes that occurred in the environment over the period of time.

7. The computing system of claim 5, wherein the instructions when executed to generate the three-dimensional representation further enable the computing system to:

determine a representation of an object in the image data;
perform motion tracking on the object; and
generate motion data and positional data for the object.

8. The computing system of claim 7, wherein the instructions when executed further enable the computing system to:
determine a texture map of the representation of the object.

9. The computing system of claim 8, wherein the instructions when executed further enable the computing system to:
generate a three-dimensional model and textures for the environment and the object based at least in part on the motion data, positional data, and texture map.

10. The computing system of claim 5, wherein the instructions when executed further enable the computing system to:
receive a request indicating a first location and a first view direction in the virtual representation of the environment;
determine a first view to provide to a user of a computing device based at least in part the first location and the first view direction;
determine first audio to be provided based at least in part on the first view; and
provide information indicative of the first view and the audio data to the user.

11. The computing system of claim 10, wherein the instructions when executed further enable the computing system to:
determine a change from the first location to a second location;
determine a second view based at least in part on the change;
determine a second audio based at least in part on the second view; and
provide a second representation of the virtual representation of the environment based at least in part on the second view and the second audio.

12. The computing system of claim 5, wherein the instructions when executed further enable the computing system to:
emit at a designated period an infrared pulse;
detect the infrared pulse; and
synchronize image capture for the plurality of cameras.

13. The computing system of claim 5, wherein the instructions when executed, further enable the computing system to:
emit at a designated period an audio notification;
detect the audio notification; and
synchronize audio captured by a plurality of microphones spatially arranged throughout the environment.

14. The computing system of claim 5, wherein a user controls a viewpoint of the virtual representation of the environment based at least on one of movement of a computing device displaying the virtual representation of the environment, voice commands, interaction with virtual controls displayed on a display screen of the computing device, interaction with physical controls coupled to the computing device, interaction with physical controls remote the computing device, or interaction with virtual controls remote the computing device.

15. A method, comprising:
receiving image data captured over a period of time, the image data being captured by a plurality of cameras positioned to capture images that sufficiently represent an environment;
receiving second image data captured over the period of time, the second image data being captured by an image sensor and including depth data and low resolution image data,
receiving audio data captured over the period of time by a plurality of microphones spatially arranged throughout the environment;
generating a three-dimensional representation of the environment;
mapping, based at least in part on respective locations of the plurality of microphones and for a number of time periods during the period of time, portions of the audio data to a region of the environment;
receiving a view direction and position; and
providing a virtual representation of the environment as represented over the period of time based at least in part on the view direction and the position, wherein respective portions of the audio are presented based at least in part on the view direction, a relative position of the user with respect to the particular view corresponding to a viewing direction, and particular region for a particular time in the virtual representation of the environment.

16. The method of claim 15, further including:
decomposing the image data into a plurality of images, each image of the plurality of images being annotated with timing data and positional data;
generating a first set of images that are spatially organized based at least in part on the positional data;
generating a second set of images that are temporally organized based at least in part on the timing data; and
stitching the first set of images and the second set of images to generate a three-dimensional representation of the environment, the three-dimensional representation reflecting changes that occurred in the environment over the period of time.

17. The method of claim 15, further comprising:
determining a representation of an object in the image data;
performing motion tracking on the object; and
generating motion data and positional data for the object.

18. The method of claim 17, further comprising:
determining a texture map of the representation of the object; and
generating a three-dimensional model and textures for the environment and the object based at least in part on the motion data, positional data, and texture map.

* * * * *